United States Patent [19]
Gilligan

[11] Patent Number: 5,605,324
[45] Date of Patent: Feb. 25, 1997

[54] ONE WAY GATE

[75] Inventor: Mark T. Gilligan, Bengeo, England

[73] Assignee: Pitney Bowes Inc., Stamford, Conn.

[21] Appl. No.: 354,982

[22] Filed: Dec. 13, 1994

[51] Int. Cl.⁶ ................................................. B65H 29/20
[52] U.S. Cl. ............................ 271/314; 193/32; 193/40; 226/147; 226/151
[58] Field of Search .......................... 101/371; 294/203; 226/148, 147, 151–156; 271/264, 272, 274, 354, 81, 182, 10, 13; 193/32–40; 192/8 A, 8 R, 126

[56] References Cited

U.S. PATENT DOCUMENTS

| 2,953,290 | 9/1960 | Kosterko et al. | 226/151 |
| 3,756,589 | 9/1973 | Carbine | 271/274 |
| 3,780,923 | 12/1973 | Merola | 226/151 |

FOREIGN PATENT DOCUMENTS

| 404133936 | 5/1992 | Japan | 271/314 |
| 405069980 | 3/1993 | Japan | 271/274 |
| 406080269 | 3/1994 | Japan | 271/264 |
| 406064774 | 3/1994 | Japan | 271/274 |

Primary Examiner—H. Grant Skaggs
Attorney, Agent, or Firm—Steven J. Shapiro; Melvin J. Scolnick

[57] ABSTRACT

In the field of transport paths used typically in postage meters, it is sometimes desired to prevent withdrawal of items in the opposite direction to forward travel along the transport path. The disclosure relates to a one way gate (10) for such a transport path including a transport surface (11). The gate includes a rotatable roller (17) disposed opposite the surface such that an item traveling forwardly along the transport path engages and rotates the roller (17); and a device preventing rotation of the roller (17) in a direction corresponding to withdrawal of an item (22) in a reverse direction along the transport path. In an embodiment described, the device preventing rotation of the roller (17) includes a moveable mounting for the roller (17) end a further surface (20a) spaced from the roller and inclined to the transport surface so that on withdrawal or reversal of an item along the transport path the roller (17) is moved by frictional engagement with the item (22) into frictional engagement with the surface (20a) thereby to prevent rotation of the roller (17). When the roller (17) is prevented from rotating, the frictional engagement between the items (22) and the roller (17) prevents movement of the item (22) in the reverse direction along a transport path.

11 Claims, 2 Drawing Sheets

ONE WAY GATE

BACKGROUND OF THE INVENTION

This invention relates to a one way gate, for items traveling along a transport path including a transport surface against which items are supported during travel. Such transport paths are commonly employed in, e.g., postage meters and other mailpiece handling apparatuses.

One problem encountered-from time to time in postage meters is that of so-called "false tripping". When a mailpiece (e.g. an envelope) is inserted into the transport path of a postage meter for franking, a mechanical or optical system detects the presence of the mailpiece and initiates rotation of the print drum of the postage meter to frank the mail or a label to be adhered to the mailpiece during operation of the machine. The mailpiece is advanced to its franking position by means of e.g. a drive roller that drives it along the transport path formed by the deck of the postage meter.

Occasionally, the drive roller fails to engage the mailpiece correctly. This may occur e.g. when the mailpiece is damaged or slippery. Usually, such imperfect gripping of the mailpiece only results in a slight delay in the mailpiece being fed to its franking position, but there is a tendency for operators of postage meters to try and pull the mailpiece backwards along the transport path to remove it from the postage meter if it is suspected that imperfect gripping of the mailpiece has occurred. When operators try and withdraw mailpieces in this way, false tripping frequently results, i.e. the postage meter print drum rotates as though a mailpiece is present, despite the absence of the mailpiece. This is a particular problem in comparatively simple postage meters lacking means for automatically verifying that the mailpiece is in the correct position for franking.

Since postage meter users pay for all postage registered by the meter regardless of whether every such registration results in the franking of a mailpiece, and since false tripping results in the decrementing of the descending register of the postage meter despite no mailpiece having been franked, it is clearly desirable to provide a means whereby the incidence of false tripping is reduced or even eliminated.

SUMMARY OF THE INVENTION

According to a first aspect of the invention, there is provided a one way gate for items traveling along a transport path including a transport surface against which items are supported during travel, the gate comprising: a rotatable roller disposed opposite said surface such that an item traveling forwardly along said transport path engages said roller; and means, including a further surface and resilient biassing means biassing the roller against movement towards and away from the transport surface and the further surface, to limit rotation of the roller in one direction, whereby travel of an item in a reverse direction along said transport path is prevented by frictional engagement between said item and the roller.

When this arrangement is incorporated into the transport path of a postage meter, it can be impossible manually to withdraw a mailpiece that has been pushed into the transport path to the extent that it engages the roller. Thus, if judiciously located and designed, the apparatus of the invention can be used to eliminate false tripping.

If the roller is biased by the biassing means to a position spaced from the further surface, rotation of the roller is not impeded when an item, e.g. a mailpiece, travels forwardly along the transport path.

Advantageously, the resilient biassing means may include a mounting member resiliently deformable towards and away from the transport surface and the further surface and adapted for the rotatable securing thereon of the roller.

Preferably, the transport surface is a generally horizontal deck adapted for the transporting of items thereon; and the further surface is spaced from and inclined relative to the deck; whereby an item traveling forwardly along the transport path in engagement with the roller urges it away from the further surface, and an item tending to travel in a reverse direction along the transport path in engagement with the roller urges it into engagement with the further surface, thereby preventing rotation of the roller in a direction corresponding to such reverse travel of an item.

An advantage of employing a further surface in conjunction with a moveable mounting is that the apparatus of the invention can be manufactured as a low cost, simple item that can readily be retro-fitted to existing apparatus such as postage meters. This means that the gate of the invention can be installed as a simple, compact modification to e.g. a low cost postage meter.

An advantage of the roller being moveable relative to the deck is that mailpieces of differing thicknesses traveling along the deck can be accommodated without the need to adjust the apparatus.

Additionally, the biassing of the roller against movement towards and away from the deck allows for a slight pre-load to be applied via the roller onto items traveling along the transport path, thereby ensuring that the items correctly move the roller against the bias according to their directions of travel.

It is preferable that the mounting member comprises a resiliently bendable support arm fixed at one end relative to the transport surface, the resilience of the support arm being substantially equal in mutually orthogonal directions in a plane generally perpendicular to its longitudinal axis.

In preferred embodiments, the equality of resilience in mutually orthogonal directions is conveniently achieved by the employment of a support arm of circular cross section.

Conveniently, the roller includes a coating or tire. Preferably, the coating or tire is or includes a cellular rubber or solid (natural or synthetic) rubber material.

Rubber materials may be advantageously chosen that do not mark items such as mailpieces, and that are not noisy in use of the roller.

Most preferably, the material of the coating or tire is or includes a material, e.g. a microcellular urethane, that tends to damp forced oscillations of the components of the gate. This material has been found to be very quiet in operation and to have good self-cleaning properties. It also tends to prevent the occurrence of "slip stick" and natural frequency oscillations of the components.

Preferably, the coefficient of friction between the roller and the further surface is at least 1.1. This value of the coefficient of friction has been found to be an optimal value to enable the gate to operate correctly when incorporated into a postage meter.

Conveniently, the further surface is inclined at an angle $\theta$ to a normal to the transport surface, wherein $\theta$ is in the range $0° < \theta < 90°$. Most preferably, $\theta$ is approximately $25°$.

These values of $\theta$ have been found to be particularly advantageous when the gate is incorporated into a postage meter. In one optional embodiment, the further surface is textured, roughened, serrated or patterned. Possibly, the presence of such texturing, roughening, serration or patterning would obviate the need for a coefficient of friction between the roller and the further surface of at least 1.1. However, the use of a high coefficient of friction is preferred since the manufacture of the gate is simplified if there is no need to treat the further surface to provide the texturing etc.

Preferably, the roller is secured to a gate wherein the roller is secured to the resilient biassing means by means of a rotatable hub. Alternatively, the roller may be rigidly secured to the resilient biassing means and rotation of the roller then occurs by virtue of rotation of the resilient biassing means.

According to a second aspect of the invention, there is provided a postage meter incorporating a gate according to any of the definitions hereinabove.

DESCRIPTION OF THE PREFERRED EMBODIMENT

Figure 1:
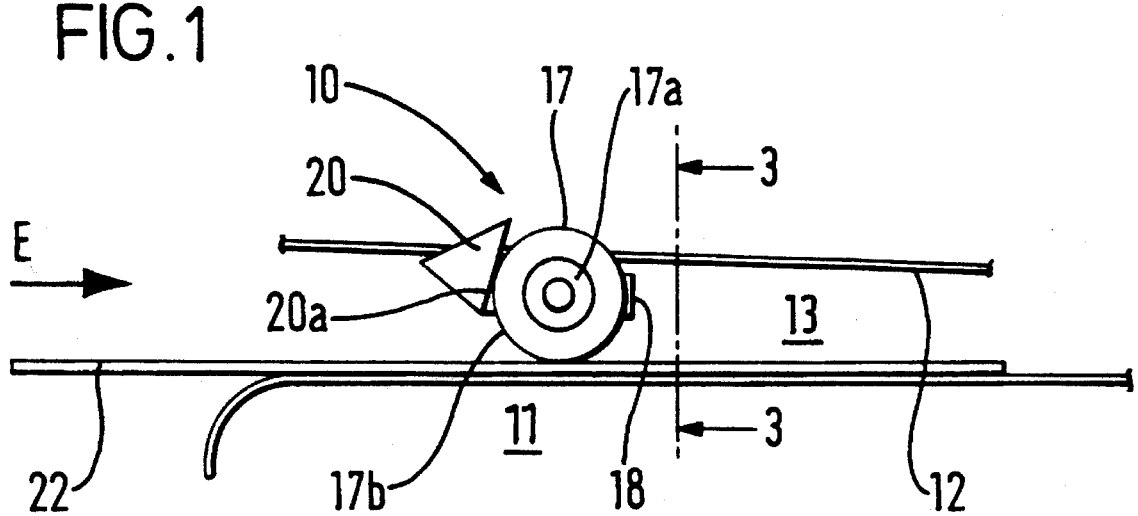
FIG. 1 is a side elevational view of a postage meter transport path incorporating a first embodiment gate according to the invention.

Referring to the drawings, there is shown a gate 10 that is incorporated into the mailpiece transport path of a postage meter. The components of the postage meter visible in FIG. 1 are the deck 11 of the postage meter base and the lower edge 12 of a member defining the upper extent of the transport path. In the embodiment shown in FIG. 1, edge 12 is the lowermost edge of a tape chute.

The lateral edges of the transport path are defined by upstanding walls, of which one, 13, is visible in the drawings.

The gate 10 comprises a flexible support arm 14 secured at one end to wall 13 by means of an appropriate mounting such as boss 16. Support arm 14 extends generally perpendicular to wall 13, to overlie deck 11.

A roller 17 is rotatably secured by suitable means, e.g. a snap fit hub construction, at the free end of support arm 14. Preferably, roller 17 overlies approximately the mid point of the deck 11 in the transverse direction thereof.

Roller 17 is disposed with its axis of rotation coinciding with the longitudinal axis of support arm 14, which latter is circular in transverse section. The components of gate 10 thus far described are of a size such that roller 17 is positioned above deck 11, with a small space (typically but not necessarily less than 6.6 mm) between the lowermost point of roller 17 and the surface of deck 11.

Roller 17 comprises a hub 17a and a peripheral tire 17b. Support arm 14 is constructed from a resilient material such as a plastics material. The circular section of support arm 14 and the uniformity of the material from which support arm 14 is constructed mean that support arm 14 is resiliently biassed to an equal extent against movement in the horizontal and vertical directions of FIG. 1.

A further boss 18 is rigidly secured to support arm 14 adjacent boss 16. Boss 18 extends to the left of support arm 14 as viewed in FIG. 1, and has extending at a right angle to its free end a further support arm 19.

Support arm 19 extends generally parallel to support arm 14, and terminates in a triangular prism 20 in the vicinity of roller 17.

Prism 20 is inclined so that one surface 20a thereof lies in close proximity to roller 17, at an angle of approximately 25° to a normal 24 (FIG. 4) to deck 11. The mounting of the components is such that roller 17 is moveable against the resilience of support arm 14 towards and away from both the deck 11 and the surface 20a, depending on the forces applied to roller 17.

It will be seen that if a mailpiece such as an envelope 22 travels from left to right along the transport path as shown by arrow E in FIG. 1, it will pass between the periphery of roller 17 and the surface of deck 11. Assuming that the envelope 22 is at least as thick as the distance between roller 17 and deck 11 when support arm 14 is in an unstressed condition, envelope 22 will engage the lowermost periphery of roller 17. The resilience of support arm 14 will force the roller 17 into firm engagement with the upper surface of envelope 22.

Continued travel of envelope 22 to the right of FIG. 1 in the direction shown by the arrow will cause roller 17 to move to the right, against the resilience of support arm 14. In this condition roller 17 is freely rotatable and hence roller 17 will be driven to rotate anti-clockwise by the motion of the envelope 22.

If an operator of the postage meter attempts to withdraw envelope 22 in the opposite direction to that of the arrow in FIG. 1, roller 17 will be pulled towards surface 20a of prism 20. This effect occurs as a result of friction between the upper surface of envelope 22 and the lowermost periphery of roller 17.

Once roller 17 engages surface 20a, friction between the tire 17b and surface 20a will prevent rotation of roller 17, which rotation would otherwise be in a clockwise direction in the arrangement shown.

Since the distance traveled by the roller 17 before it engages surface 20a is small, in practice the clockwise rotation of roller 17 is prevented virtually instantaneously when an operator attempts to withdraw the envelope 22.

Thus it will be seen that roller 17 is effectively only rotatable in one direction, i.e. the direction corresponding to forward travel of the envelope 22 along the transport path. When an attempt is made to withdraw the envelope 22 in the opposite direction, the roller 17 is prevented from rotating and frictional engagement between roller 17 and envelope 22 prevents withdrawal of envelope 22.

The gate of the invention can readily be incorporated into existing designs of postage meter bases, if necessary as a retro-fittable item. Moreover, access to the deck 11 in a direction perpendicular to the arrow E in FIG. 1 is not impeded by the installation of the gate 10. Therefore, in the event of a total jamming of the transport path, a jammed envelope 22 can be withdrawn sideways from the postage meter.

When the gate is used in a postage meter, the tire 17b must in practical embodiments be of a kind that does not mark mailpieces passing through the postage meter. Additionally, operation of the gate must be as silent as possible even when mailpieces are passed rapidly through the apparatus.

Some polyisoprene materials (i.e. synthetic, solid rubbers) are known that wear in such a way as to be self-cleaning. Experiments were carried out employing such materials to manufacture the tire 17b. Such materials were found to function well from the point of view of self cleaning of the tire surface (and hence non-marking of the envelopes 22), but a noise problem arose during use of the gate 10.

Therefore, further experiments were carried out using cellular rubbers that are known to hold paper dust and dirt in their cells during operation. As the cellular rubber wears, new cells are exposed that are clean, so keeping the frictional surface in good condition.

Most cellular rubbers have cells of various sizes, and when used in the gate 10 of the invention they did not function well. However, it was found that cellular rubbers having substantially uniform cell sizes and shapes perform well as the material of the tire 17b. The most preferred form of cellular rubber is that which is known as "microcellular urethane".

Figure 4:
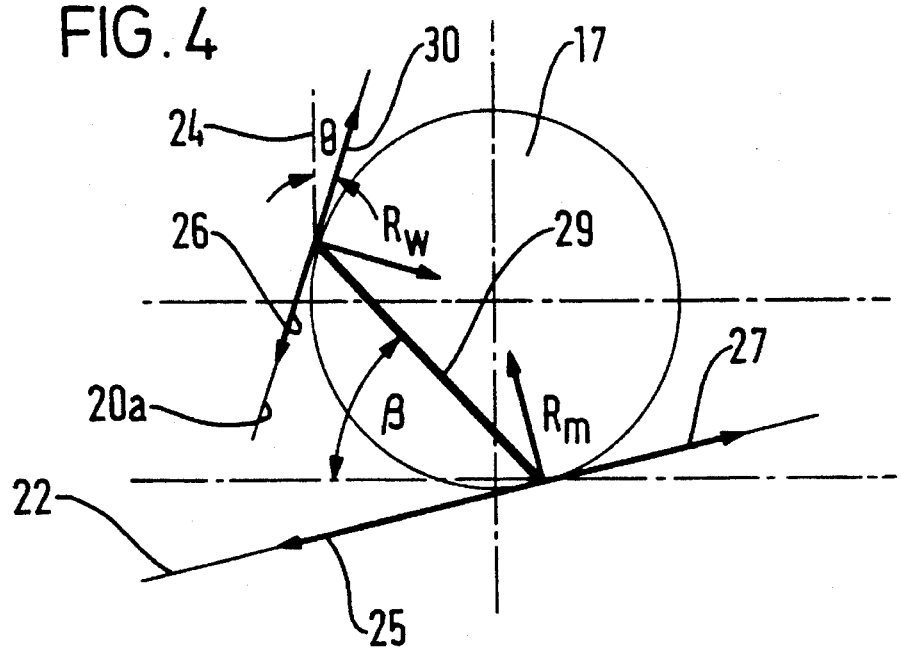
FIG. 4 is a schematic representation of part of the gate of FIGS. 1 to 3, showing the resolution of forces in the components.

Referring now to FIG. 4, there is shown a schematic representation of roller 17, envelope 22 and surface 20a, to illustrate the resolution of forces during use of the gate 10 to prevent withdrawal of an envelope 22.

The angle of surface 20a to a normal 24 to the deck 11 is denoted by θ. Theoretically, θ can lie in the range 0°<θ<90°.

In use of the gate 10 to prevent withdrawal of envelope 22, friction forces act parallel to the surface 20a and the surface of the envelope 22 as a result of the application of a pull force 25. The friction force acting parallel to the surface 20a is the wall friction, denoted by reference numeral 26. The friction force component acting parallel to the surface of the envelope 22 is referred to as the mail friction and is denoted in FIG. 4 by the reference numeral 27. The orthogonal components of wall friction 26 and mail friction 27 are denoted in FIG. 4 by the reference signs $R_w$ and $R_m$.

The forces acting on the wall and envelope are equivalent to a single cam arm schematically represented by the solid line 29 acting between the points of contact of the roller respectively with the envelope 22 and the surface 20a.

Cam arm 29 acts at an angle β to the deck 11, wherein β equals (90+θ)/2.

The angle of the envelope 22 to horizontal in FIG. 4 has a maximum value equal to the slope of the deck (6° to horizontal in the embodiment shown, although other angles are possible). This maximum value is achieved in cases when the envelope 22 is flexible enough to be deflected into the deck by the roller. The minimum value of the angle of the envelope 22 to horizontal is 0°. This arises when the envelope is so stiff that it does not deflect.

Mail friction 27 equals the coefficient of friction (tire material to envelope) multiplied by $R_m$, the force component perpendicular to the envelope. Similarly, the wall friction 26 equals the coefficient of friction (tire material to wall) multiplied by $R_w$, the component perpendicular to the wall.

The pull force 25 and slip force 30 (on the wall) are the actual forces applied to the envelope and wall respectively against the friction forces. Failure of the one way gate effect occurs when either of these forces exceeds the relevant available friction force. Clearly, the value of θ and the coefficients of friction are critical to the operation of the one way gate effect.

It has been found that an optimal value of θ is 25° to maximise the value of wall friction. It has also been found that the coefficient of friction between the tire material and surface 20a should be at least 1.1 when θ has a value of 25°.

Investigations have shown that for angles of θ greater than 25°, the compression loading due to camming becomes very high for relatively small pull forces 25. If this occurs, there is a danger that the tire 17b compresses, the mountings spread and therefore the envelope 22 can be withdrawn against the resulting backlash in the components and hence moved relative to the deck. Such withdrawal of the envelope 22 is not a result of slipping but of deformation of the components.

Clearly the need to use a value of θ of approximately 25° results in a need for a high coefficient friction (as aforesaid) between the material of the tire and the surface 20a. In cases where is it desired to employ a larger value of θ, or wherein it is difficult to attain the desired minimum coefficient of friction of 1.1, an arrangement such as that shown in FIG. 5 may be used.

Figure 5:
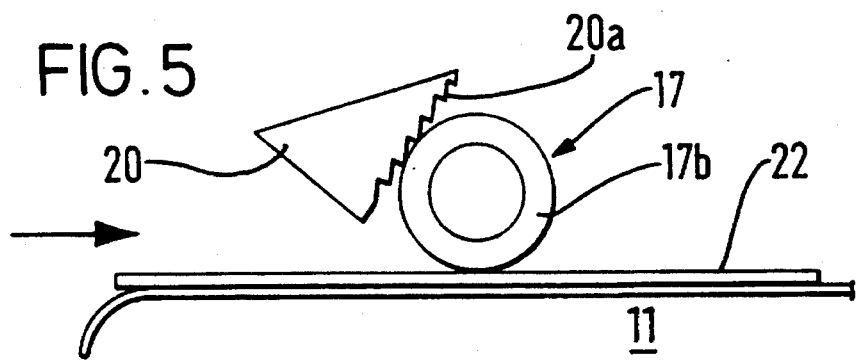
FIG. 5 shows the components of FIG. 1 modified to constitute a second embodiment of the invention.

As shown in FIG. 5, the surface 20a has been textured, roughened, serrated or patterned to enhance the amount of grip between the tire 17b and the surface 20a.

Various types of patterning, roughening, etc. may be employed, and it should be realized that the serration, toughening, etc. need not be limited to the saw tooth profile shown in FIG. 5. However, the tooth profile shown is preferred because the teeth are angled such that they tend to bite firmly into the material of the tire 17b on clockwise rotation of roller 17, yet they tend not to bite into the tire 17b on anticlockwise rotation of roller 17.

Figure 2:
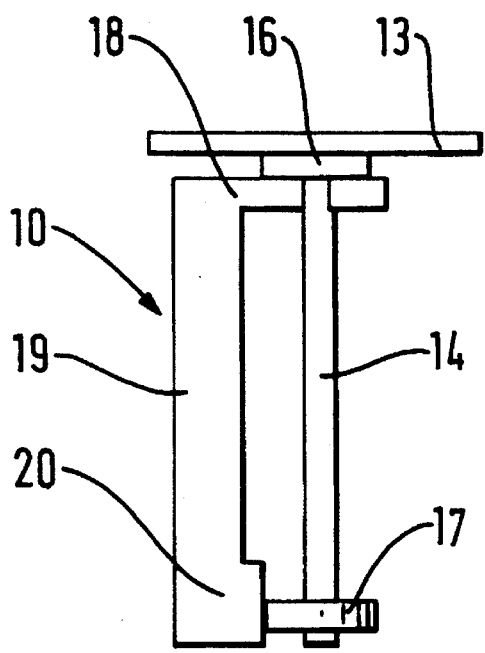
FIG. 2 is a top plan view of the gate shown in FIG. 1.
Figure 3:
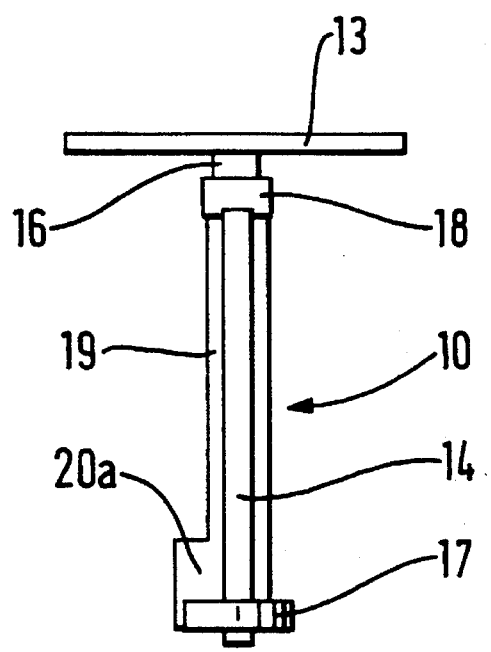
FIG. 3 shows the gate of FIGS. 1 and 2 viewed along the arrows 3—3.
Figure 6:
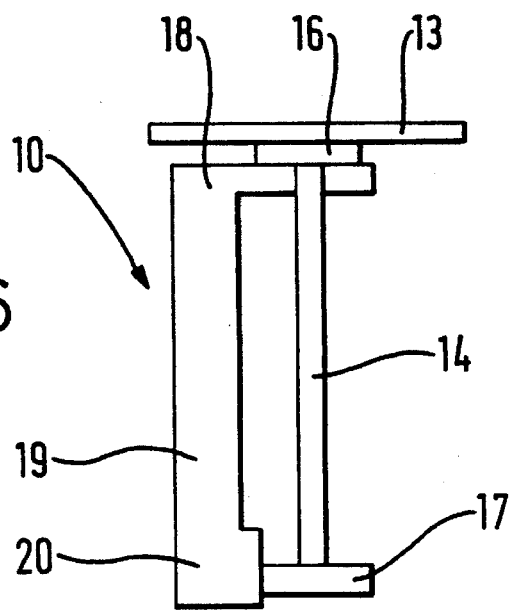
FIG. 6 shows an alternative mounting arrangement of the roller that may be employed in the FIG. 1 and 5 embodiments.

In the embodiment of FIG. 6, which shows a view similar to FIG. 2, the hub 17a securing the roller 17 to the support arm 14 is absent and the roller 17 and support arm 14 are rigidly secured to one another e.g. by virtue of these two components having been molded as a single item. Such an arrangement is advantageously cheap and simple to manufacture. In this embodiment any rotation of the roller takes place as a result of rotation of the support arm, either against its own torsional rigidity or as a result of the rotational mounting of support arm 14 in boss 16.

When the roller 17 is arranged to rotate by virtue of the torsional rotation of the support arm as aforesaid, in practice the amount of rotation of the roller is limited. A degree of skidding or sliding may therefore be expected on insertion of an envelope when this version of the invention is employed. Nonetheless, it is believed that there would also be some rotation of the roller 17 thereby minimizing the possibility of damage to the envelope occurring. On attempted withdrawal of the envelope, the limited rotatability of the roller would not be of concern since the further surface 20a tends to prevent reverse rotation of the roller 17 in any event. Indeed, the limited rotatability of roller 17 may advantageously assist this effect.

I claim:

1. A one way gate for items traveling along a transport path including a transport surface against which items are supported during travel, the gate comprising:

a rotatable roller disposed opposite said transport surface such that an item traveling forwardly along said transport path engages said roller; and means, including a further surface and resilient biasing means biasing the roller against movement toward and away from the transport surface and the further surface, to limit rotation of the roller in one direction, whereby travel of an item in a reverse direction along said transport path is prevented by frictional engagement between said item and the roller;

wherein the resilient biasing means includes a mounting member resiliently deformable towards and away from the transport surface and the further surface and adapted for the rotatably securing thereon of the roller;

wherein the mounting member comprises a resiliently bendable support arm fixed at one end relative to the transport surface, the resilience of the support arm being substantially equal in mutually orthogonal directions in a plane generally perpendicular to the longitudinal axis of the support arm.

2. A gate according to claim 1, wherein the transport surface is a generally horizontal deck adapted for the transporting of items thereon; and the further surface is spaced from and inclined to said deck; whereby an item traveling forwardly along the transport path in engagement with the roller urges it away from the further surface, and an item tending to travel in a reverse direction along the transport path in engagement with the roller urges it into engagement with the further surface, thereby preventing rotation of the roller in a direction corresponding to such reverse travel of an item.

3. A gate according to claim 1 wherein the roller includes a coating or tire.

4. A gate according to claim 3, wherein the material of the coating or tire is rubber material.

5. A gate according to claim 4, wherein the material is a microcellular urethane, that tends to damp forced oscillations of the components of the gate.

6. A gate according to claim 3 wherein the coefficient of friction between the roller and the further surface is at least 1.1.

7. A gate according to claim 1 wherein the further surface is inclined at an angle $\theta$ a normal to the transport surface, wherein $\theta$ is in the range $0° \leq \theta \leq 90°$.

8. A gate according to claim 7 wherein $\theta$ is approximately 25°.

9. A gate according to claim 7 wherein the further surface is textured, roughened, serrated, or patterned.

10. A one way gate for items traveling along a transport path including a transport surface against which items are supported during travel, the gate comprising:

a rotatable roller disposed opposite said transport surface such that an item traveling forwardly along said transport path engages said roller; and means, including a further surface and resilient biasing means biasing the roller against movement toward and away from the transport surface and the further surface, to limit rotation of the roller in one direction, whereby travel of an item in a reverse direction along said transport path is prevented by frictional engagement between said item and the roller;

wherein the roller is secured to the resilient biasing means by means of a rotatable hub.

11. A one way gate for items traveling along a transport path including a transport surface against which items are supported during travel, the gate comprising:

a rotatable roller disposed opposite said transport surface such that an item traveling forwardly along said transport path engages said roller; and means, including a further surface and resilient biasing means biasing the roller against movement toward and away from the transport surface and the further surface, to limit rotation of the roller in one direction, whereby travel of an item in a reverse direction along said transport path is prevented by frictional engagement between said item and the roller;

wherein the roller is rigidly secured to the resilient biasing means and rotation of the roller occurs by virtue of rotation of the resilient biasing means.

* * * * *